United States Patent [19]
Broussard, Jr.

[11] Patent Number: 5,707,530
[45] Date of Patent: Jan. 13, 1998

[54] METHOD FOR CLARIFYING CONTAMINATED FLUIDS

[75] Inventor: Paul C. Broussard, Jr., Lafayette, La.

[73] Assignee: Paul C. Broussard, Sr., Maurice, La.

[21] Appl. No.: 677,504

[22] Filed: Jul. 10, 1996

Related U.S. Application Data

[60] Division of Ser. No. 657,672, May 31, 1996, which is a continuation-in-part of Ser. No. 444,908, May 18, 1995, Pat. No. 5,522,999, which is a division of Ser. No. 359,406, Dec. 20, 1994, Pat. No. 5,492,622, which is a continuation-in-part of Ser. No. 179,042, Jan. 7, 1994, Pat. No. 5,376,266, which is a continuation-in-part of Ser. No. 123,231, Sep. 20, 1993, Pat. No. 5,407,584, which is a continuation-in-part of Ser. No. 26,877, Mar. 8, 1993, Pat. No. 5,300,222, which is a continuation-in-part of Ser. No. 965,888, Oct. 23, 1992, Pat. No. 5,277,803, which is a continuation of Ser. No. 589,471, Sep. 28, 1990, Pat. No. 5,158,678.

[51] Int. Cl.$^6$ ........................................ C02F 1/24
[52] U.S. Cl. .................. 210/703; 210/708; 210/788; 210/789
[58] Field of Search ............................ 210/703, 708, 210/788, 789, 787; 209/170, 730

[56] References Cited

U.S. PATENT DOCUMENTS 4,094,783  6/1978  Jackson.
4,331,534  5/1982  Barnscheidt.
4,876,016  10/1989  Young.

FOREIGN PATENT DOCUMENTS 4-166280  6/1992  Japan.

*Primary Examiner*—Thomas M. Lithgow
*Attorney, Agent, or Firm*—George A. Bode; Daniel E. Maddux; Bode & Associates

[57] ABSTRACT

The method of the present invention comprises introducing a contaminated fluid mixture containing solids, liquid and contaminating fluid into a preliminary separator to separate the contaminating fluid from the principal liquid and solids; tangentially introducing the contaminated fluid mixture into a vertical cylindrical vessel in a circular motion to further separate the contaminating fluid from the principal liquid and solids; introducing air into the contaminated fluid mixture to further separate the contaminating fluid from the liquid and solids; maintaining the circular flow of the contaminated fluid mixture within the vessel to separate the fluid into contaminating fluid, clean liquid and solid contaminants; collecting the contaminating fluid in a reservoir; removing the contaminating fluid from the reservoir; and, discharging the clean liquid from the vessel.

12 Claims, 3 Drawing Sheets

METHOD FOR CLARIFYING CONTAMINATED FLUIDS

This is a division of application Ser. No. 08/657,672 filed May 31, 1996, (pending) which is a continuation-in-part application of a previous application by the same inventor bearing U.S. Ser. No. 08/444,908 filed May 18, 1995, (now U.S. Pat. No. 5,522,999) which is a divisional application of U.S. Ser. No. 08/359,406 filed Dec. 20, 1994, now U.S. Pat. No. 5,492,622 issued Feb. 20, 1996, which is a continuation-in-part application of U.S. Ser. No. 08/179,042 filed Jan. 7, 1994, now U.S. Pat. No. 5,376,266 issued Dec. 27, 1994, which is a continuation-in-part application of U.S. Ser. No. 08/123,231 filed Sep. 20, 1993, now U.S. Pat. No. 5,407,584 issued Apr. 18, 1995, which is a continuation in part application of U.S. Ser. No. 08/026,877 filed Mar. 8, 1993, now U.S. Pat. No. 5,300,222 issued Apr. 5, 1994, which is a continuation-in-part application of U.S. Ser. No. 07/965,888 filed Oct. 23, 1992, now U.S. Pat. No. 5,277,803 issued Jan. 11, 1994, which is a continuation application of U.S. Ser. No. 07/589,471 filed Sep. 28, 1990, now U.S. Pat. No. 5,158,678 issued Oct. 27, 1992. The entire previous applications are incorporated herein by reference as if set forth in full below.

BACKGROUND OF THE INVENTION

1. Field of the Invention

The present invention relates to an apparatus and method for separating the contaminants from a contaminated fluid mixture, particularly an apparatus and method for separating oil and other contaminants from water in a contaminated mixture.

2. General Background

Clean water is becoming scarce due to its wide use in many industries, including the oil and gas industry, and in pulp and paper mills, municipal waste treatment facilities, steel mills, food processing plants and electric generating plants. Polluted water, containing contaminating fluids, such as oil, and solid contaminants, is a by-product and ever-growing problem of these industries. In particular, the production of oil and gas wells and the refinement of these fluids produces contaminated wastewater. A need exists to clarify and recover the water from the contaminated wastewater.

Several devices have been proposed for recovering the water by clarifying and/or separating out the contaminants from the wastewater.

U.S. Pat. Nos. 5,407,584 and 5,300,222, both issued to applicant's assignee, and entitled "Water Clarification Method" and "Water Clarification Method And Apparatus", respectively, teach a method and apparatus for separating oil-gas vapors and solids from a liquid which has a separator vessel with a cyclonic flow chamber and a tangential inlet with a spiral preliminary separator to introduce the fluid and establish a swirling body of fluid. The cyclonic flow chamber has concentric shells positioned below the tangential inlet for discharging separated solids and further separating oil and water. The cyclonic flow chamber and the separator vessel wall form a fluid flow zone where eductors aerate the water and oil mixture, thereby separating them. A vertical outlet port discharges separated oil and gas from the upper portion of the cyclonic flow chamber to a fluid flow zone wherein the oil and gas are separated. The separated water, oil, gas and solids are removed through discharge ports in the separator vessel.

U.S. Pat. No. 4,731,164 issued to W. R. WILLIAMSON and entitled "Multi-Stage Flash Evaporator" discloses a multi-flash evaporator wherein the fluid to be flashed is tangentially fed to each stage through an inlet which enters each stage about the midpoint of each stage.

The aforediscussed U.S. Pat. Nos. 5,407,584 and 5,300,222 are somewhat complex in design, having multiple separation stages with the separation method separating different contaminants at different stages.

The aforediscussed U.S. Pat. No. 4,731,164 is concerned with separating contaminated fluids through heat, not physical separation through turbulence.

Thus, a need exists for an apparatus and method for removing oil and solids from contaminated water which is simple in design, requiring fewer parts and/or stages than the prior art devices.

A need also exists for an apparatus and method with the above features that accomplish the above stated separation in one stage or fluid flow area.

SUMMARY OF THE PRESENT INVENTION

The preferred embodiment of the apparatus of the present invention solves the aforementioned problems in a straight forward and simple manner. What is provided is an apparatus and a method for clarifying a contaminated fluid mixture, such as oily water, containing water, contaminating solids and contaminating fluids. The apparatus comprises a vertically standing cylindrical vessel for separating the contaminants from the principal liquid; means for tangentially introducing the contaminated fluid mixture into the vessel so as to establish a swirling body of fluid therein; aeration means for introducing air or other gases, in the form of micro-fine bubbles, into the contaminated fluid in the vessel such that the swirling motion of the fluid causes the bubbles to rise to the surface of the contaminated fluid mixture, entrapping and separating the contaminating fluid from the principal liquid and solids in the contaminated fluid mixture; and, a reservoir or container for collecting the contaminating fluid floating on the surface of the contaminated fluid mixture, the container being located in the upper portion of the vessel. The introducing means extends into the upper portion of the vessel, below the top of the container. The aeration means extends into the lower portion of the vessel.

The method of the present invention comprises introducing a contaminated fluid mixture containing water, contaminating solids and contaminating fluids into a preliminary separation means for producing bubbles in the contaminated fluid mixture to entrap and separate the contaminating fluids from the principal liquid and solids in the contaminated fluid mixture; tangentially introducing the contaminated fluid mixture from said preliminary separation means into a vertically standing cylindrical vessel in a circular motion such that the contaminating fluid will further separate from the principal liquid and solids, and rise to the surface of the swirling fluid mixture; introducing air in the form of micro-fine gas bubbles into the middle of the swirling fluid mixture such that the micro-fine bubbles rise to the surface of the fluid, further entrapping and separating the contaminating fluid from the principal liquid and solids in the contaminated fluid mixture; maintaining the circular flow of the contaminated fluid within the vessel such that the fluid separates out into contaminating fluid on the surface of the fluid mixture, clean liquid in the middle of the fluid mixture, and solid contaminants at the bottom of the fluid mixture which settle to the bottom of the vessel; collecting the contaminating fluid on the surface of the contaminated fluid in a container by controlling the level of the contaminated fluid mixture in the vessel; and discharging the clean liquid through a discharge port provided in the lower portion of the vessel.

In view of the above, it is an object of the present invention to provide an apparatus and method for removing oil and solids from water which is simple in design, requiring fewer parts and/or stages than the prior art devices.

It is a further object of the present invention to provide such an apparatus and method with the above features that accomplishes the above stated separation in one stage or fluid flow area.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
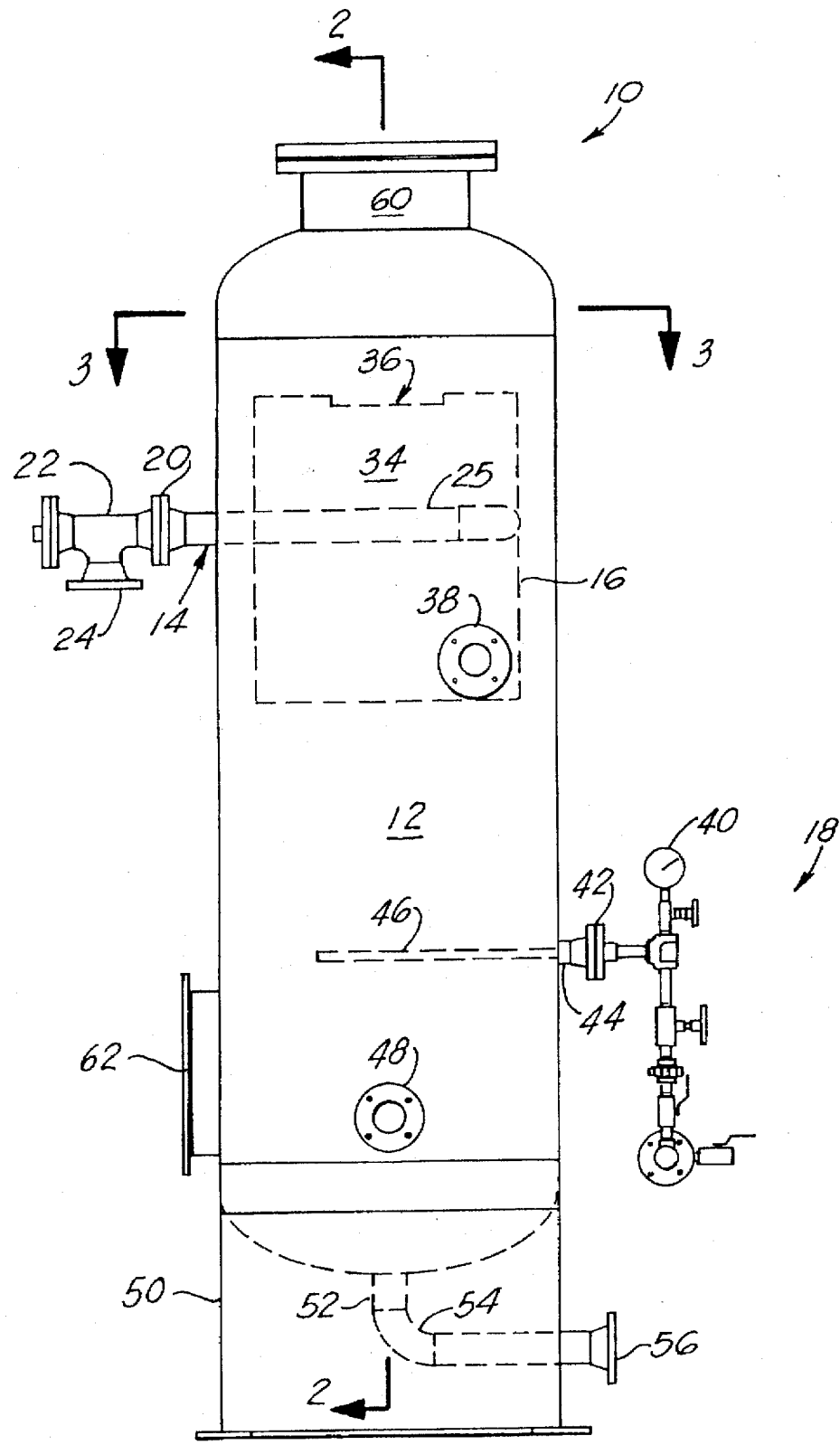
FIG. 1 is a side view of the preferred embodiment of the apparatus of the present invention with some interior features shown in phantom lines.

Referring now to the drawing, and in particular FIG. 1, the apparatus of the present invention is designated generally by the numeral 10. Apparatus 10 clarifies contaminated fluid mixtures, such as oily water, by separating contaminating fluids, such as oil, and solid contaminants, from the principal liquid, such as water. Apparatus 10 is generally comprised of vertically standing cylindrical vessel 12 for separating therein the contaminants from the contaminated mixture, introducing means 14 for tangentially introducing the contaminated fluid mixture into vessel 12, oil reservoir or container 16 for collecting contaminating fluid (oil) from the contaminated fluid mixture and means 18 for aerating the contaminated fluid mixture and further separating the contaminating fluid from the principal liquid and solids in the contaminated fluid mixture.

Vessel 12 has outlets 38 and 48 for discharging contaminated fluid and separated principal liquid, respectively. Waste oil discharge outlet 38 is located in the upper portion of vessel 12 and lower portion of reservoir 16 and removes oily liquid from reservoir 16. Clean liquid outlet 48 is located in the lower portion of vessel 12. Discharge piping 52 is located in the bottom of vessel 12 for discharging solid contaminants after they settle to the bottom of vessel 12. Vessel 12 is mounted on support 50. Discharge piping 52 extends downwardly from vessel 12, turns ninety (90°) degrees via elbow 54 and exits from support 50 to connect to piping (not shown) via outlet port 56.

Manways 60 and 62 are located in the top and in the lower portion, respectively, of vessel 12 to allow access for maintenance and repair. Vessel 12 can be a pressurized vessel or an atmospheric vessel. Vessel 12 is preferably as vertically elongated as possible to provide more space for separation of the contaminating fluid from the principal liquid.

Figure 2:
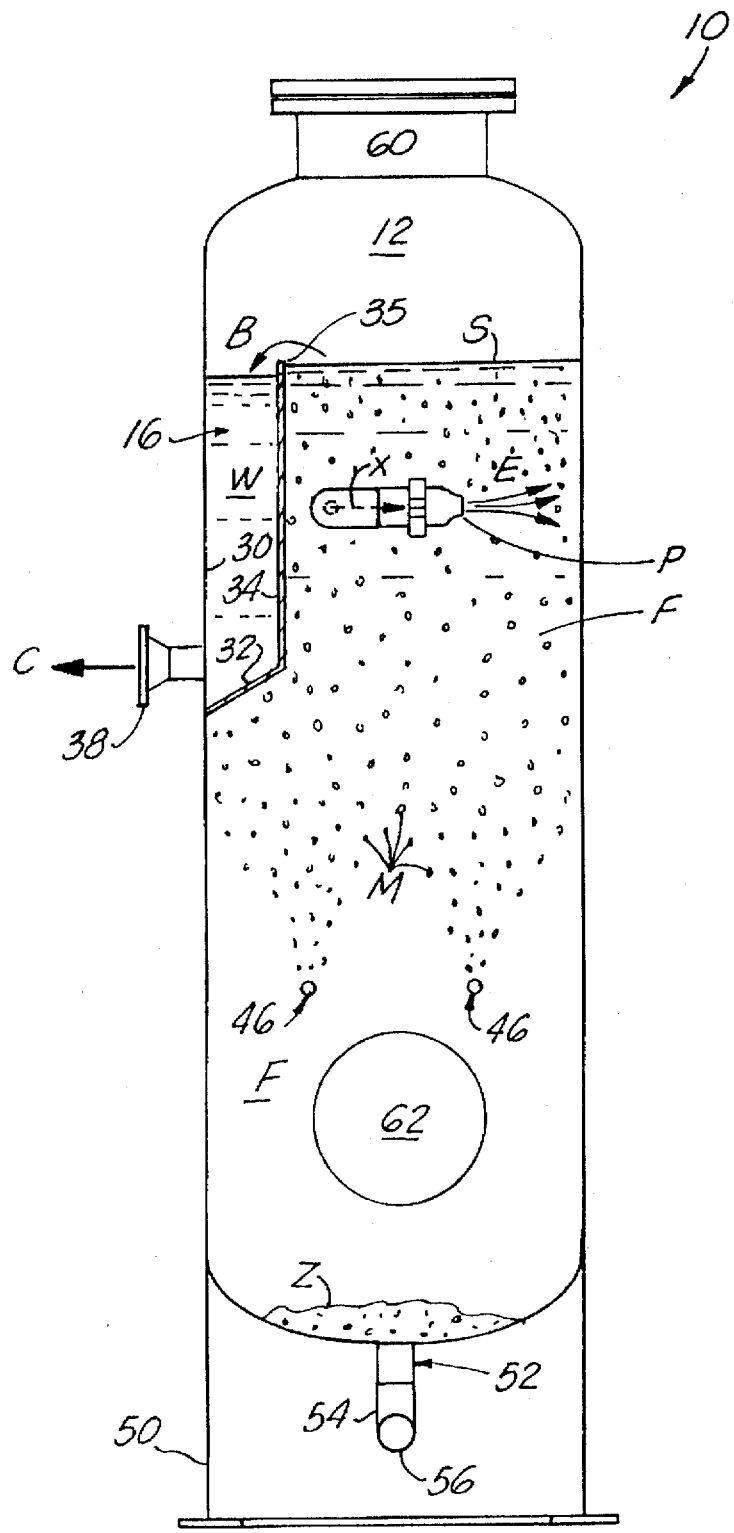
FIG. 2 is a cross-sectional view of the embodiment of FIG. 1 taken along Lines 2—2 of FIG. 1, and, further, illustrating the method of the present invention.
Figure 3:
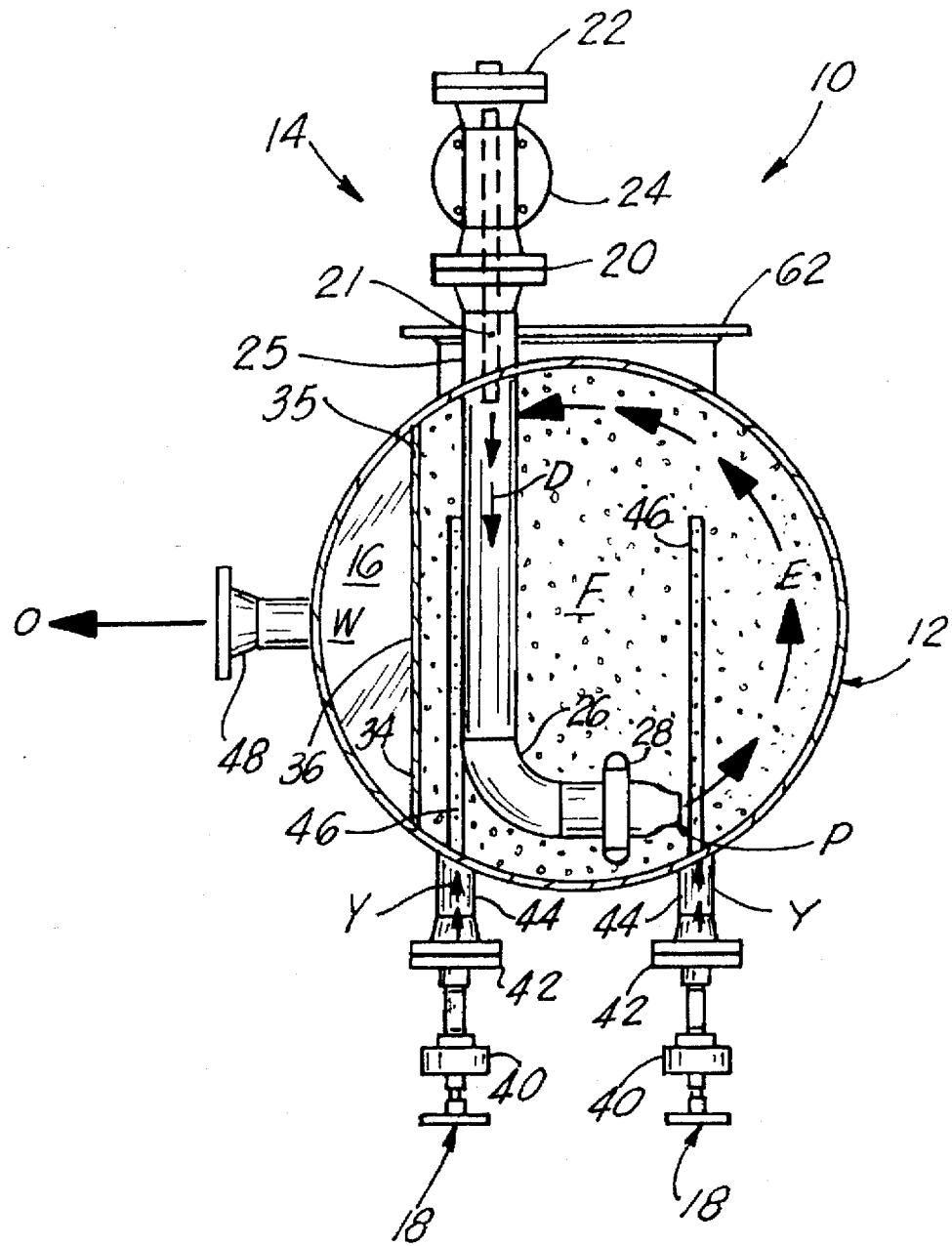
FIG. 3 is a cross-sectional view of the embodiment of FIG. 1 taken along Lines 3—3 and, further, illustrating the method of the present invention.

Introducing means 14 extends into the upper portion of vessel 12, preferably about 1 foot below surface S of contaminated fluid mixture F from a source (not shown), as best seen in FIG. 2. Introducing means 14 includes inlet T-section 22, inlet port 24 mounted on T-section 22 for accepting the contaminated fluid mixture F, and vessel inlet 20 which is connected on one end to T-section 22 and sealingly mounted on the other end to vessel 12 to transport the contaminated fluid mixture F into vessel 12. Introducing means 14 also includes inlet pipe 25 which is connected to inlet 20 at its proximate end and, extends horizontally into vertical vessel 12 turning substantially ninety (90°) degrees (away from wall 34 of reservoir 16) via elbow 26 at its distal end to contour to the shape of the interior wall of vessel 12, as best seen in FIG. 3. The curved shape of this distal end portion of pipe 25 contributes to the circular flow (ARROWS E) of the contaminated fluid mixture F in vessel 12. Introducing means 14 also includes preliminary separation means 21 for producing turbulence and bubbles (not shown) in the incoming contaminated fluid mixture F such that the bubbles trap and separate the contaminating fluid from the liquid and solids in the contaminated fluid mixture F, as best seen in FIG. 3. Preferably, preliminary separation means 21 is a sparging tube mounted in T-section 22 and extending through inlet 20 into the proximate portion of pipe 25. Introducing means 14 also includes restrictor orifice 28 mounted at the distal end of pipe 25 to increase the velocity of the contaminated fluid mixture F as it enters vessel 12, as best seen in FIGS. 2 and 3. This increased velocity due to orifice 28 contributes to the circular flow (ARROWS E) of the contaminated fluid mixture F in vessel 12, as best seen in FIG. 3.

Oil reservoir or container or waste bucket 16 is mounted interiorly of and in the upper portion of vessel 12 such that pipe 25 of introducing means 14 is positioned horizontally adjacent the midpoint of container 16. Wall portion 30 of vessel 12, spaced vertical plate 34 and angulated plate 32 together form container 16, as best seen in FIG. 2. Waste discharge outlet 38 is located in wall portion 30, near the bottom of container 16. The top edge 35 of vertical plate 34 has a weir 36, best seen in FIG. 1, which selectively allows contaminating fluid to spill over into container 16. Contaminating fluid is removed from container 16 through waste discharge outlet 38, as best seen in FIG. 2.

Aerating means or eductors 18 extend into the lower portion of vessel 12, above clean liquid outlet 48. Eductors 18 preferably extend horizontally into vessel 12 about one and one-half (1½) feet above outlet 48. Eductors 18 provide air to vessel 12 from a source of air (not shown) through gas head feeders 40, which are connected to pipes 44 via air inlets 42, as best seen in FIG. 3. Inlets 42 are sealingly connected to vessel 12. Sparging tubes 46, which have smaller diameters than pipes 44, are mounted to pipes 44 and extend horizontally into vessel 12. Sparging tubes 46 introduce air in the form of micro-fine gas bubbles M into contaminated fluid mixture F in vessel 12, as best seen in FIG. 2. These micro-fine bubbles M further entrap and separate the contaminating fluid from the principal liquid and solids in the contaminated fluid mixture F in vessel 12.

Referring now to FIGS. 2 and 3, the method of the present invention is best illustrated. Contaminated fluid mixture F, such as oily water, containing contaminating fluids, such as oil, and solid contaminants, and a principal liquid, such as water, is introduced to preliminary separation means 21. Preliminary separation means 21 creates an immediate mixing action, producing turbulence and bubbles (not shown) in the contaminated fluid mixture F. These bubbles entrap and separate the contaminating fluid from the principal liquid and solids in the contaminated fluid mixture F. The contaminated fluid mixture then flows through vessel inlet 20 and pipe 25, as indicated by ARROW X in FIG. 2 and ARROW D in FIG. 3, and is tangentially introduced to vessel 12 at POINT P. Pipe 25 is curved ninety (90°) degrees, via elbow 26, to contour the shape of vessel 12, thereby creating a circular flow of contaminated fluid mixture F in vessel 12, as indicated by ARROWS E in FIGS. 2 and 3. Restrictor orifice 28 increases the velocity of the contaminated fluid mixture F entering vessel 12, thereby improving the circular flow of contaminated fluid mixture F in vessel 12, as best seen in FIG. 2.

Upon introduction of the contaminated fluid to vessel 12, sparging tubes 46 of eductors 18 air, in the air, in the form of micro-fine gas bubbles M into contaminated fluid mixture F to further entrap and separate the contaminating fluid from the principal liquid and solids in the contaminated fluid mixture F, as indicated by ARROWS Y in FIG. 3. The micro-fine bubbles M are introduced in the lower portion of vessel 12 above clean liquid outlet 48, to increase the amount of contaminating fluid entrapped and separated.

Contaminated fluid mixture F is maintained in a circular flow around vessel 12 such that the contaminating fluid separates from the principal liquid and solids and rises to surface S of contaminated fluid mixture F, as best seen in FIG. 2, and the solids separate from the liquid and settle to the bottom of vessel 12 (collected solids Z in FIG. 2), leaving clean principal liquid (water) in the middle portion of vessel 12.

The circular flow of contaminated fluid mixture F is maintained such that the level of the fluid mixture F remains around the height of weir 36 of container 16, as best seen in FIG. 2. The separated contaminating fluid on surface S of contaminating fluid mixture F spills over weir 36 and is collected in container 16, as indicated by ARROW B in FIG. 2. Contaminating fluid W (principally oil) is then drained from container 16 through waste discharge outlet 38, as indicated by ARROW C in FIG. 2.

The clean liquid (substantially water) is discharged through clean liquid outlet 48 provided in the lower portion of vessel 12, as indicated by ARROW O in FIG. 3, and collected solids Z are removed from vessel 12 through discharge pipe 52.

In operation, a contaminated fluid mixture F containing oil, water, and solids is introduced to apparatus 10 through inlet port 24 of introducing means 14. The mixture F enters T-section 22, where it contacts sparging tube 21. Sparging tube 21 creates an immediate mixing action, producing turbulence and bubbles (not shown) in the mixture F. These bubbles trap and separate the oil from the water and solids in the mixture F (oily water). The mixture F then flows through vessel inlet 20 and pipe 25, as indicated by ARROW X and ARROWS D, in FIGS. 2 and 3, respectively, and is tangentially introduced to vessel 12 at POINT P. Pipe 25 is curved ninety (90°) degrees, via elbow 26, to contour to the shape of vessel 12, thereby creating a circular flow of fluid mixture F (oily water) in vessel 12, as indicated by ARROWS E in FIGS. 2 and 3. Restrictor orifice 28 increases the velocity of the fluid mixture F entering vessel 12, thereby improving the circular flow of the mixture F in vessel 12.

Upon introduction of fluid mixture F (oily water) into vessel 12, sparging tubes 46 of eductors 18 introduce air in the form of micro-fine gas bubbles M into the oily water to further entrap and separate the oil from the water and solids in the oily water, as indicated by ARROWS Y in FIG. 3. The micro-fine gas bubbles M are introduced in the lower portion of vessel 12 above clean liquid outlet 48, to increase the amount of oil entrapped and separated.

The oily water mixture F is maintained is a circular flow around vessel 12 such that the oil separates from the water and solids and rises to surface S of the oily water mixture F, as best seen in FIG. 2, and the solids separate from the water and settle to the bottom of vessel 12 due to the action of gravity, leaving clean water in the middle portion of vessel 12.

The circular flow of the oily water mixture F is maintained such that the level of the oily water remains around the height of weir 36 of container 16, as best seen in FIG. 2. The separated oil on surface S of the oily water F spills over weir 36 and is collected in container 16, as indicated by ARROW B in FIG. 2. The oil is then drained from container 16 through waste discharge outlet 38, as indicated by ARROW C in FIG. 2.

The clean water is discharged through clean liquid 10 outlet 48 provided in the lower portion of vessel 12, as indicated by ARROW O in FIG. 3, and the collected solids Z are removed from vessel 12 through discharge pipe 52.

As can be seen from the above description and drawing, apparatus 10 is simple in design, requiring fewer parts and/or stages than the previous devices discussed above.

Furthermore, apparatus 10 accomplishes the separation process in one stage or fluid flow area, thus allowing apparatus 10 to clarify more contaminated fluid than the previous devices discussed above.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for clarifying a contaminated fluid mixture containing contaminating fluid, a principal liquid and solids, comprising the steps of:

(a) introducing a contaminated fluid mixture into a preliminary separation means for producing gas bubbles in said contaminated fluid mixture to entrap and separate the contaminating fluid from the principal liquid and solids in said contaminated fluid mixture;

(b) tangentially introducing said contaminated fluid mixture from said introducing step into the upper portion of a vertical cylindrical vessel thereby producing circular motion such that said contaminating fluid mixture will further separate from said principal liquid and solids and rise to an upper surface of said contaminated fluid mixture in said vessel;

(c) introducing air in the form of micro-fine gas bubbles into the mid-region of said contaminated fluid mixture such that the circular motion of said contaminated fluid causes said gas bubbles to rise to the surface of said contaminated fluid mixture in said vessel, further entrapping and separating contaminating fluid from said principal liquid and solids in said contaminated fluid mixture;

(d) maintaining the circular flow of said contaminated fluid mixture in said vessel from said air introducing step such that said contaminated fluid mixture separates into contaminating fluid on the surface of said contaminated fluid mixture in said vessel, the solids separating from the liquid and settling on the bottom of said vessel, and the separated liquid settling in the mid-region of said vessel;

(e) collecting the contaminating fluid on the surface of said contaminated fluid mixture from said maintaining step in a reservoir by controlling said contaminated fluid mixture level within said vessel, thereby allowing said contaminated fluid on said surface to spill over into said reservoir, said reservoir comprising:

i) a substantially vertical weir or wall portion spaced from said tangentially introduced contaminated fluid mixture and extending laterally in said upper portion of said vessel;

ii) a bottom portion connected to said vertical wall portion and the inside wall of said vessel, wherein said reservoir is open at its top within said upper portion of said vessel and said reservoir has a generally segment shaped cross section; and, iii) an outlet port provided in the wall of said upper portion of said vessel and in the lower portion of said reservoir;

(f) removing said contaminated fluid from said reservoir; and, (g) discharging the separated liquid from said maintaining step through a discharge port provided in the lower portion of said vessel.

2. The method of claim 1, further comprising the step of increasing the velocity of said contaminated fluid mixture prior to said tangentially introducing said contaminated fluid mixture into said vessel.

3. The method of claim 1, wherein in said tangentially introducing step, said contaminated fluid mixture is tangentially introduced into said vessel below the surface of said contaminated fluid mixture in said vessel.

4. The method of claim 1, wherein in said maintaining step, the solids are separated from the principal liquid by gravity.

5. A method for clarifying a contaminated fluid mixture containing contaminating fluid, a principal liquid and solids, comprising the steps of:

(a) introducing a contaminated fluid mixture into a horizontally positioned preliminary separation means for producing gas bubbles in said contaminated fluid mixture to entrap and separate the contaminating fluid from the principal liquid and solids in said contaminated fluid mixture;

(b) tangentially introducing said contaminated fluid mixture from said introducing step into the upper portion of a vertical cylindrical vessel thereby producing circular motion such that said contaminating fluid mixture will further separate from said principal liquid and solids and rise to an upper surface of said contaminated fluid mixture in said vessel;

(c) introducing air in the form of micro-fine gas bubbles into the mid-region of said contaminated fluid mixture such that the circular motion of said contaminated fluid causes said gas bubbles to rise to the surface of said contaminated fluid mixture in said vessel, further entrapping and separating contaminating fluid from said principal liquid and solids in said contaminated fluid mixture;

(d) maintaining the circular flow of said contaminated fluid mixture in said vessel from said air introducing step such that said contaminated fluid mixture separates into contaminating fluid on the surface of said contaminated fluid mixture in said vessel, the solids separating from the liquid and settling on the bottom of said vessel, and the separated liquid settling in the mid-region of said vessel;

(e) collecting the contaminating fluid on the surface of said contaminated fluid mixture from said maintaining step in a reservoir by controlling said contaminated fluid mixture level within said vessel, thereby allowing said contaminated fluid on said surface to spill over into said reservoir, said reservoir comprising:

i) a substantially vertical weir or wall portion spaced from said tangentially introduced contaminated fluid mixture and extending laterally in said upper portion of said vessel;

ii) a bottom portion connected to said vertical wall portion and the inside wall of said vessel, wherein said reservoir is open at its top within said upper portion of said vessel and said reservoir has a generally segment shaped cross section; and, iii) an outlet port provided in the wall of said upper portion of said vessel and in the lower portion of said reservoir;

(f) removing said contaminated fluid from said reservoir; and, (g) discharging the separated liquid from said maintaining step through a discharge port provided in the lower portion of said vessel.

6. The method of claim 5, further comprising the step of increasing the velocity of said contaminated fluid mixture prior to said tangentially introducing said contaminated fluid mixture into said vessel.

7. The method of claim 5, wherein in said tangentially introducing step, said contaminated fluid mixture is tangentially introduced into said vessel below the surface of said contaminated fluid mixture in said vessel.

8. The method of claim 5, wherein in said maintaining step, the solids are separated from the principal liquid by gravity.

9. A method for clarifying a contaminated fluid mixture containing contaminating fluid, a principal liquid and solids, comprising the steps of:

(a) introducing a contaminated fluid mixture into a horizontally positioned preliminary seperation means for producing gas bubbles in said contaminated fluid mixture to entrap and separate the contaminating fluid from the principal liquid and solids in said contaminated fluid mixture;

(b) tangentially introducing said contaminated fluid mixture from said introducing step into the upper portion of a vertical cylindrical vessel thereby producing circular motion such that said contaminating fluid mixture will further separate from said principal liquid and solids and rise to an upper surface of said contaminated fluid mixture in said vessel;

(c) introducing air in the form of micro-fine gas bubbles into the mid-region of said contaminated fluid mixture such that the circular motion of said contaminated fluid causes said gas bubbles to rise to the surface of said contaminated fluid mixture in said vessel, further entrapping and separating contaminating fluid from said principal liquid and solids in said contaminated fluid mixture;

(d) maintaining the circular flow of said contaminated fluid mixture in said vessel from said air introducing step such that said contaminated fluid mixture separates into contaminating fluid on the surface of said contaminated fluid mixture in said vessel, the solids separating from the liquid and settling on the bottom of said vessel, the separated liquid settling in the mid-region of said vessel and the entrapped and separated contaminating fluid rising to the upper region of said vessel;

(e) collecting the contaminating fluid on the surface of said contaminated fluid mixture from said maintaining step in a reservoir within said vessel by controlling said contaminated fluid mixture level within said vessel, thereby allowing said contaminated fluid on said surface to spill over into said reservoir, said reservoir comprising:
i) a substantially vertical weir or wall portion spaced from said tangentially introduced contaminated fluid mixture and extending laterally in said upper portion of said vessel;
ii) a bottom portion connected to said vertical wall portion and the inside wall of said vessel, wherein said reservoir is open at its top within said upper portion of said vessel and said reservoir has a generally segment shaped cross section; and,
iii) an outlet port provided in the wall of said upper portion of said vessel and in the lower portion of said reservoir;

(g) removing said contaminated fluid from said reservoir; and, (f) discharging the separated liquid from said maintaining step through a discharge port provided in the lower portion of said vessel.

10. The method of claim 9, further comprising the step of increasing the velocity of said contaminated fluid mixture prior to said tangentially introducing said contaminated fluid mixture into said vessel.

11. The method of claim 9, wherein in said tangentially introducing step, said contaminated fluid mixture is tangentially introduced into said vessel below the surface of said contaminated fluid mixture in said vessel.

12. The method of claim 9, wherein in said maintaining step, the solids are separated from the principal liquid by gravity.

* * * * *